Figure 1:
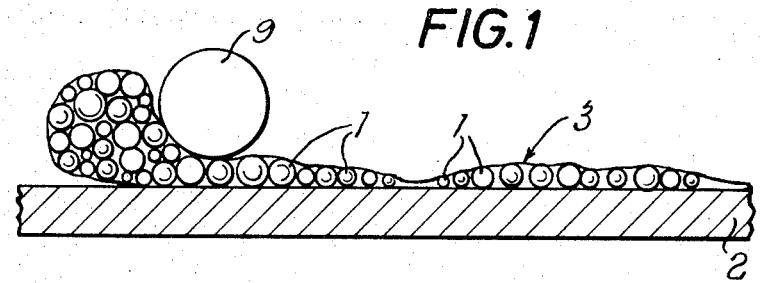

United States Patent [19]

Foster et al.

[11] 3,859,110

[45] Jan. 7, 1975

[54] SURFACE FINISHES

[75] Inventors: Norman Foster; Rosemary P. Lee, both of Southampton, England

[73] Assignee: Brown & Williamson Tobacco Corporation, Louisville, Ky.

[22] Filed: Oct. 25, 1973

[21] Appl. No.: 409,364

[30] Foreign Application Priority Data
Nov. 6, 1972 Great Britain.................... 51083/72

[52] U.S. Cl.................. 117/27, 101/32, 101/401.1, 117/33, 117/37 R, 156/209, 264/293
[51] Int. Cl............................. B44d 1/02, B44c 1/24
[58] Field of Search ......... 117/26, 33, 37 R, 38, 27; 156/209, 219, 220; 161/DIG. 5, DIG. 3; 264/284, 293; 101/32, 401.1; 164/6

[56] References Cited
UNITED STATES PATENTS
2,804,417  8/1957   Cross et al. ........................ 161/202
3,696,741  10/1972  Reinke............................ 101/128.3

*Primary Examiner*—Mayer Weinblatt
*Assistant Examiner*—Bruce H. Hess
*Attorney, Agent, or Firm*—Finnegan, Henderson, Farabow & Garrett

[57] ABSTRACT

The invention relates to a method for the production of a decorative surface finish on a material, in which a settable substance, such as a varnish, incorporating microspheres or other small hard bodies is coated upon a substrate and set thereon and the coated substrate is employed in the embossment of the said material with the said finish. The coated substrate may be employed directly for the embossment or used for moulding a die employed for the embossment.

6 Claims, 5 Drawing Figures

SURFACE FINISHES

This invention concerns improvements relating to the production of surface finishes or textures for providing a surface with a decorative appearance, particularly but not exclusively for a decorative pack or packaging material.

According to the invention, a composition comprising a settable substance, such as a varnish or lacquer, incorporating small hard bodies, suitably microspheres or beads, is applied to a substrate, suitably a plate or roller, which is employed in embossing a packaging or like material.

After drying, the substrate possesses a coating having a wavy or undulating surface suitably for embossing packaging materials in known manner. The embossing may be carried out continuously by using a roller as substrate or intermittently by using a reciprocating die.

The small bodies are preferably in the size range of 20–300 microns and may be microspheres of glass or of plastics such as polystyrene.

The settable substance may be a varnish of the air-drying type such as an unsaturated oil-based resin or of the temperature-curing type such as polyurethane or may be a preformed polymer dissolved in a solvent, examples of the latter type being polyvinyl acetate and cellulose derivatives.

The surfaces of various materials can be embossed, for example plastics (including metallised plastics), carton board, paper or paper board and metal foil. The surface may have previously been coloured or printed. The attractive effect is enhanced if the surface is highly reflective, for example of metallised foil, coated paper or thin board.

The finish thus produced in simple fashion is wavy or undulating, but smooth to the touch, as it represents the contours or shape of the spheres or beads whose size may be considerably greater than the thickness of the varnish or other settable medium alone. In the coating, varnish seems partially to drain from the surface of each sphere, leaving only a thin coating over its top.

The embossed material may be used advantageously for containers, such as cartons and boxes, for example for cosmetics or tobacco products and to produce exterior and/or interior decorative effects for other purposes.

Figure 2:
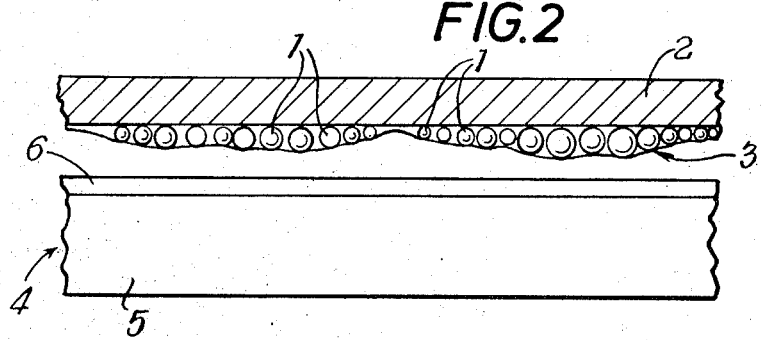
Figure 3:
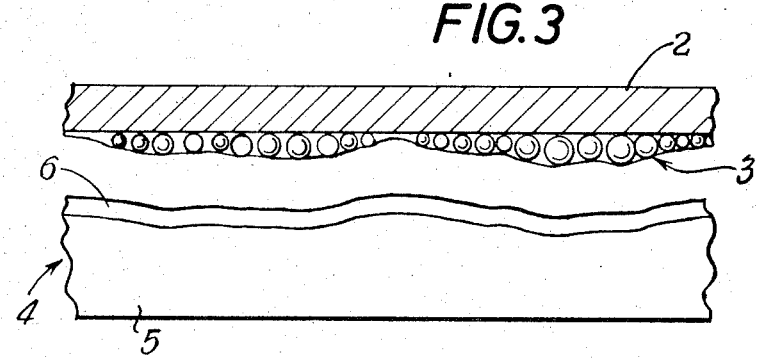
Figure 4:
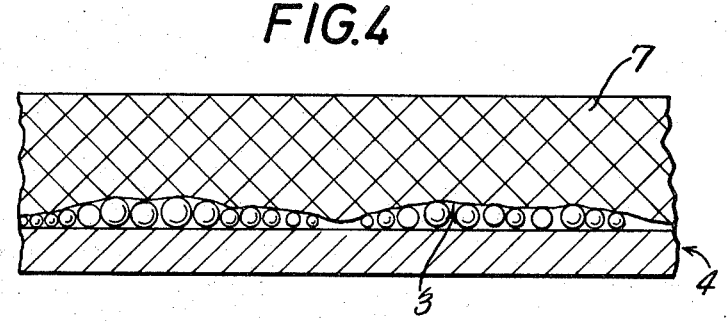
Figure 5:
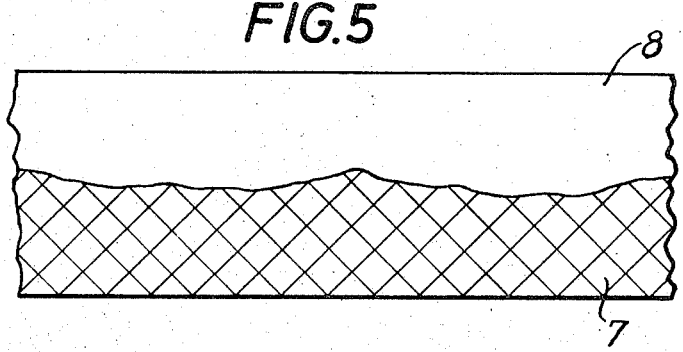

Examples of ways of carrying the invention into effect will now be more fully described with reference to the accompanying purely diagrammatic drawings, in which:

FIG. 1 illustrates the coating of a substrate with a composition comprising a varnish and glass microspheres, FIGS. 2 and 3 the use of the coated substrate in the embossing of a packaging material, and FIGS. 4 and 5 the use of the coated substrate as a master in the production of an embossing die.

Referring to FIG. 1, a composition comprising 2 parts by weight of a drying-oil-modified-polyurethane varnish, for example the transparent varnish supplied by International Paints Ltd. under the designation "Blue Peter", and 1 part by weight of glass microspheres 1 of diameters varying from .177–297 micron is applied to a substrate 2 so as to give a coating 3 having an average weight of 100–200 g/m². The composition is applied by the known method, commonly known as the Mayer Bar method, in which the material to be coated is moved under a helically wire-wound cylindrical metal bar 9 which remains stationary. As shown in greatly exaggerated fashion in the drawing, the coating 3, in which the microspheres 1 are covered by the varnish on the side remote from the substrate 2, is of irregular thickness due to the varying sizes of the microspheres, the layer being generally only one microsphere thick. The material employed for the substrate 2 will depend upon the manner in which it is to be used. It may, for instance, be a metal sheet or a plate of hardened thermoplastic material. In the former case, for example, the substrate 2 may be a steel sheet 0.1 mm thick, 30 cm long and 15 cm wide, which is coated with 75 g of the above composition after cleaning of the surface of the sheet by acetone. The composition is poured onto one end of the substrate 2, held horizontally, and is spread uniformly by the bar 9, in the form of a steel rod of 6 mm diameter and 30 cm length. Care is taken to keep the substrate 2 flat during coating and a tray is provided at the other end to take excess composition. The coating produced is allowed to dry and set hard, for example at 150°C for 3 hours.

As shown in FIG. 2, the coated substrate thus produced is used as a die for embossing a packaging material 4, for example a laminate about 300 micron thick consisting of carton board 5 lined with aluminium foil 6, or a transparent polystyrene packaging film material about 100 micron thick. After embossment, the packaging material 4 has a microdimpled but smooth surface texture complementary to that of the coating 3, as is apparent from FIG. 3. The embossment may be effected by mounting the substrate 2 on a flat plate which is reciprocatable to press the coating 3 against the material 4. Alternatively the coated substrate placed with the coating 3 in contact with the face of the material 4 may be passed between the rollers of a roller press. A further procedure is to clamp the coated substrate 2 to one of a pair of cylinders forming a nip through which the material 4 is passed.

By the above-described methods, carton-blank material can be embossed directly by the coated substrate 4. Alternatively, however, the coated substrate may be used as a master for the production of an embossing die. This is carried out in known manner in two stages, the production firstly of a negative and secondly of a positive version of the master. FIG. 4 shows the negative 7 moulded to the coating 3 from a cold-curing silicone rubber or a thermo-setting pigmented synthetic-resin material. After curing, the hard negative 7, FIG. 5, is then used for the moulding of a positive counterpart 8, either from the same or another thermo-setting or curable resin material or from a metal alloy of low melting point.

Finally, the hard positive 8 thus produced can be used as an embossing die for producing packaging material with a decorative surface in a continuous operation by a rotary or reciprocatory press.

Examples of other coatings which may be employed are as follows:

1. A composition comprising 3 parts by weight of a linseed-oil-based alkyd-resin varnish and 2 parts by weight of glass microspheres of diameter ranging from 140–250 microns is similarly applied to a substrate to give a coating having a weight of 100–120 g/m².

2. A composition comprising 3 parts by weight of a drying-oil modified-polyurethane varnish and 1 part by weight of glass microspheres of diameter varying from 36–73 micron is similarly applied to a substrate to give a coating of 100–120 g/m² weight.

3. A composition comprising 2 parts by weight of a long-oil-length alkyd-resin varnish of high gloss type and 1 part by weight of glass microspheres of diameter sizes 44–88 micron is similarly applied to a substrate to give a coating of 100–120 g/m² weight.

4. A composition comprising 4 parts by weight of an oil-modified polyurethane varnish and 1 part by weight of polystyrene microspheres of diameters ranging from 125–212 micron is applied to a substrate to give a coating of 75–90 g/m² weight.

These coatings, used for embossment purposes, also produced a shiny and wavy or undulating surface texture with an attractive random pattern.

Instead of using a distributing bar, the coating may be applied to the substrate by other means, for example by a spraying device or rollers. Instead of coating the substrate with the prepared composition, the settable substance may first be applied and the microspheres or other small bodies deposited on the said substance while still wet. A further application of the settable substance may follow.

If required, a surface finish with a definite pattern may be applied, especially to packaging material, by distributing the microspheres according to size to conform with the required pattern. An engraving effect can be thus obtained.

We claim:

1. A method for the production of a decorative surface finish on a material, wherein a settable substance incorporating small hard microspheres is coated upon a substrate and is set thereon and the thusly coated substrate is subsequently employed in the embossment of the said material.

2. A method according to claim 1, wherein the settable substance is a varnish.

3. A method according to claim 1, wherein the microspheres are within the size range of 20–300 microns.

4. A method according to claim 1, wherein the coated substrate is itself employed directly for the embossment of the said material.

5. A method according to claim 1, wherein the coated substrate is used for the molding of a die which is employed for the embossment of the said material.

6. A material provided with a decorative surface finish by the method according to claim 1.

* * * * *